United States Patent Office 3,380,862
Patented Apr. 30, 1968

3,380,862
SOLDER FLUX
John J. O'Brien, Watertown, Mass., assignor to W. R. Grace & Co., Cambridge, Mass., a corporation of Connecticut
No Drawing. Filed May 5, 1965, Ser. No. 453,521
8 Claims. (Cl. 148—23)

ABSTRACT OF THE DISCLOSURE

The compositions are of the zinc chloride-ammonium chloride type which are used on the surface of soldering baths when molten solder is flowed into the side seam of container bodies. An alkali metal chloride or a mixture thereof is included in the compositon to increase its flux life.

---

This invention in concerned with a solder flux adapted to be used in molten condition on a solder bath, and especially on solder baths maintained at comparatively high temperatures.

It is well known in the art to apply solder to moving articles by transferring the molten solder from a bath or tank to the article by utilizing a roll or other means which engages the article in a wiping action. Such a procedure has been widely used in applying solder along the side seam of metal can bodies to produce a strong, hermetic seal.

In the manufacture of can bodies, suitably notched sheet metal blanks are fed to a forming station where they are shaped and where the opposed marginal edges which ultimately form the side seam of the can are reversely bent into oppositely directed body hooks. The body hooks are then interengaged and flattened by bumping to form an interlocked seam. After the forming operation, the can bodies are conveyed in longitudinal spaced relationship over a rotating solder roll which engages against the seam of the bodies as they are moved edgewise therealong. The solder roll, which is partially submerged in a bath of molten solder, raises the solder in a film and wipes it into the side seam. Ordinarily, the molten solder is maintained at a temperature considerably in excess of its melting point so that the solder will remain fluid until capillarity has drawn enough liquid into the seam to flood it.

In order to keep the surface of the solder roll clean and "tinned," it is customary to use a flux on that side of the bath where the roll enters the solder. For this purpose, the flux employed should be capable of efficiently removing oxide coatings and other interfering films from the roll so as to create surface conditions which will permit the molten solder to flow freely and spread completely over the working surface of the roll. Also, the flux should have a reasonably long pot life, i.e. the wetting properties and cleaning efficiency of the flux should extend over a period of several hours under the operating conditions employed.

Because of the low tin-content solders used in the can making industry today, solder baths must be maintained at comparatively high temperatures. For example, the tin-lead solders presently employed contain about 5 percent or less of tin and have a melting point in excess of 600° F. Therefore, the soldering baths must be maintained at a temperature in the range of between about 670° and 780° F., and usually between about 725° and 760° F. so that the molten solder will have the flow characteristics necessary to allow a sufficient amount of material to enter the body seams to provide the necessary hermetic seal.

While various fluxes have been employed with tin-lead solders, zinc-ammonium chloride fluxes have been the most widely used. One of the most satisfactory fluxes of this type contains a body of low density, inert, granular particles capable of absorbing the fused zinc-ammonium salts. Such a flux, when compared to an identical composition without a granular absorber, is active over longer periods of time under similar operating conditions. Presumably, the granular mass serves as a heat insulator which lowers the temperature of the crystal surface over the solder surface temperature. Also, the individual particles appear to serve as nuclei for the condensation of ammonium chloride thereby reducing the volatilization of this substance which is needed to regenerate the fluxing power of the zinc chloride by reacting with the zinc oxychloride formed from the reaction of zinc chloride and metal oxide on the solder roll surface. Because of its increased active life under various operating conditions, this flux has been widely used in can making and other applications where the articles to be soldered are passed over the solder roll at a comparatively rapid rate. However, in order to achieve and maintain top production speeds, the can making industry today demands a flux having an even linger pot life especially at temperatures of 725° F. and above so that there will be fewer delays for replenishing the spent flux.

According to the present invention, it has been found that a flux having an extended life for use on high temperature solder baths can be produced by adding thereto certain specific amounts of an alkali metal chloride or mixtures thereof. Briefly, the flux of the present invention comprises at least about 60 weight percent of zinc-ammonium chloride, at least about 1.5 weight percent of inert, low density particles capable of absorbing the fusible flux ingredients, and at least about 1.5 weight percent of a member selected from the group consisting of an alkali metal chloride and mixtures thereof.

By adding an alkali metal chloride to an absorber-containing flux, a substantial increase in the active life of the composition is obtained over a wide temperature range. Though high soldering speeds and high solder bath temperatures are known to shorten pot life, the flux of the present invention exhibits increased pot life in typical commercial procedures where the cans are advanced over the solder roll at a rate of 300 to 400 per minute and where the bath is maintained at a temperature of between about 725° and 780° F. Also, the use of an alkali metal chloride and mixtures of these chlorides in the amounts indicated results in a lower melting point for the flux so that fusible ingredients become liquid at much lower temperatures and, therefore, may be readily absorbed by the inert granular mass at temperatures well below that of the solder bath. As a result, there is less tendency for the ammonium chloride to escape since it is absorbed at a temperature considerably below its volatilization temperature. In addition, the efficiency of the flux is greater during the first few minutes of operation and little, if any, stirring or other attention is required once operating temperatures have been reached. The lower melting point also allows greater latitude with respect to the usefulness of the flux since it may be employed on solder baths maintained at low and high temperatures alike.

In preparing the flux of the present invention, the zinc chloride and ammonium chloride may be combined in varying proportions as known in the art. However, because of its regenerative function, it is preferred to employ the ammonium chloride in an amount of at least about 44 percent by weight as based on the total of zinc chloride and ammonium chloride present. Preferably, the ammonium chloride is used in an amount between about 44 and 54% by weight of the mixture since amounts above about 54% tend to increase the fusion temperature so that the flux is reluctant to melt below soldering temperatures. To obtain the desired proportions, these ingredients may be added as the single salts, the double salt ($ZnCl_2 \cdot 2NH_4Cl$), the triple salt ($ZnCl_2 \cdot 3NH_4Cl$) or the single, double and triple salts may be used in admixture.

The total amount of zinc-ammonium chloride i.e., zinc chloride plus ammonium chloride used in the flux may vary over a relatively wide range depending upon the other ingredients employed. However, the composition should contain at least about 60 weight percent zinc-ammonium chloride in order to assure rapid and effective removal of the metal oxide film from the solder roll surface.

The alkali metal chlorides employed include, for example, sodium chloride, potassium chloride, or a mixture of these chlorides in which the sodium and potassium chlorides may be used in any proportion in the mixture. The total quantity of alkali metal chloride used ranges between about 1.5 and 22.5 weight percent of the flux composition, and for obtaining optimum flux life, the amount employed is preferably between about 4 and 18 weight percent. At least about 1.5 weight percent is necessary to obtain extended flux life at high operating temperatures and to obtain a melting point of 600° F. and below. Above about 22.5 weight percent of alkali metal chloride, the efficiency and active life of the flux tends to decrease since the alkali metal chloride is an inert material and, therefore, dilutes the fluxing power of the active fluxing ingredients viz., the zinc and ammonium chlorides.

The mass of granular material which is added to the flux as the absorber should be substantially inert and should have a low bulk density, i.e., low in comparison to the density of typical molten zinc-ammonium chloride fluxes which usually ranges between about 2.2 and 2.7 grams per cubic centimeter. While it is preferred to use an absorber with a minimum bulk density since maximum effectiveness is obtained with a minimum added weight of material, any particulate absorber which is inert and buoyant in the molten flux is useful. In general, the granular material employed has a bulk density of between about 0.10 and 1.0 gram per cubic centimeter. The particle size range of the absorber particles does not appear to be critical.

Low density granular materials which may be used as the absorber are "popped" aggregates, such as, expanded volcanic ash (perlite), expanded blast furnace slag and expanded shale which are made by passing small granules of the naturally occurring rock through an intensely hot furnace where the grain is disrupted and the apparent density of the rock falls to about 0.12 to 0.16 gram per cubic centimeter. Another useful material is spherulized clay which is made by spherulizing a clay slurry containing an expanding agent and then passing the resulting spherules into a furnace where the surface of each particle is sintered by heat and a tiny hollow sphere is formed by the generation of steam and gas within the spherule. Also suitable for use as the granular absorber are exfoliated vermiculite, scoria, pumice, glass microballoons, diatomaceous earth ("Celite") and other inert, low density siliceous materials.

Since it is frequently desirable to obtain maximum absorption with a minimum amount of absorber so as to provide a thin but effective layer of flux composition on the solder surface, it is preferred to use a low density granular material made up of individual particles which are highly porous and which have a large surface area for both adsorbing and absorbing the fusible flux ingredients. Typical of such materials are perlite and "Celite." In general, however, an absorber in which the individual particles are substantially non-porous are as useful as one in which the particles are somewhat porous since the overall effectiveness of the granular absorber in contributing to increased flux life is due to the absorbency of the entire mass of particles.

The amount of granular absorber added may vary over a relatively wide range. In general, the granular material should be used in an amount of at least about 1.5 weight percent of the total composition in order to achieve a significant and commercially valuable increase in flux life. The maximum amount of absorber that can be added depends upon the particular material employed since the maximum quantity of material which may be added to the flux to give an operable composition varies with the physical nature of the absorber. In this respect, the porosity and shape of the individual particles which make up the granular mass are of particular importance. In order to be operable, the flux composition must possess mobility so that it will lie against the solder roll and wick flux on the roll surface. Normally, the composition will be mobile and keep the roll surface "tinned" as long as noticeable quantities of flux remain on the surface of the individual particles. However, if the absorber particles have a surface configuration such that an appreciable binding between particles results, the maximum quantity of absorber that will give a mobile composition is less than if the particles exhibit little tendency toward binding. Also, a substantially non-porous particle will displace only its own volume of molten flux and, therefore, a greater quantity of non-porous material may be added to the composition than in the case where the individual particle may absorb some of the flux within its body.

The effect of porosity and particle shape is seen from a comparison of three typical absorber materials. Exfoliated vermiculite, which has a bulk density of 0.10 and 0.13 gram per cubic centimeter, has a plate-like structure which is highly porous and which results in a slight amount of binding between particles. The maximum quantity of this material which may be added to give a still workable flux composition is only about 12 weight percent. Expanded volcanic ash, which has a comparable low density of about 0.12 and 0.19 gram per cubic centimeter, is also highly porous. However, the particles in this instance are quite spherical in configuration and therefore, are less subject to binding. Consequently, this material may be used in slightly larger amounts of up to about 17 weight percent. On the other hand, spherulized clay particles are almost perfect spheres and have a bulk density of about 0.4 to 0.6 rgam per cubic centimeter. Since these clay particles are individually non-porous and since they are not subject to binding, the maximum quantity which may be added to give a workable flux may exceed 60 weight percent without adversely affecting the composition. However, maximum effectiveness in extending flux life can be obtained when the clay is used in lesser amounts, e.g. between about 10 and 15 weight percent.

As indicated above, it is difficult to express the upper limit for absorber with mathematical exactness due to differences in bulk density and certain other characteristics of the particular materials used. However, the precise upper limit in terms of weight percent may be readily determined by simple experimentation with the specific granular material it is desired to empoy. For all practical purposes, the quantity of granular material added should not be in excess of that amount at which a film of flux remains visible on the surface of the individual particles forming the absorber and preferably, the molten flux should occupy the intervening spaces between the granules so that a very thin liquid layer of flux will be formed between the solder flux surface and the floating mass of granules containing absorbed flux.

In addition to the zinc ammonium chloride, the alkali metal chloride and low density, inert granular absorber, the flux of the present invention preferably contains zinc oxide or zinc carbonate. Besides preventing caking of the flux during storage, these compounds also help to minimize the release of corrosive acid ammonium chloride fumes. The amount of zinc oxide and zinc carbonate needed to obtain the desired results is usually about 5 weight percent based on the total composition and generally ranges between about 5 and 25 weight percent.

Also, it is advantageous to include a minor amount of resin in the composition to increase flux life. The resin employed must have the essential property of melting before it begins to decompose upon being heated to fluxing temperatures so that it forms a scum on the surface of the flux before it hardens and carbonizes. At soldering temperatures the scum is partly liquid, but is largely wet, carbonized minute resin particles. It is believed that this scum makes the flux mass more impermeable to air and also, that it imposes an additional restraint on the escape of ammonium chloride vapor.

The resins employed for this purpose generally have a melting point in the range of about 250° to 360° F. and are used in an amount of between about 0.1 and 1.0 weight percent of the flux composition. Among the resins which may be used is the gasoline-insoluble resin obtained from the extraction of pine wood in aromatic solvents; the hard, dark-colored, partially gasoline-soluble fraction obtained as a by-product in the manufacture of grade FF wood rosin; and the so-called "modified" resoles of the phenol-formaldehyde condensation type. Particularly useful phenol-formaldehyde resins are the resoles modified with rosin esters. Specific rosin ester-modified resoles include the "Beckacite" resins, such as "Beckacite No. 1100," a resole modified with the glycerine ester of rosin and the "Pentacite" resins, such as "Pentacite No. 1405," a resole modified with the pentaerythritol ester of rosin.

The following examples are given to further illustrate the present invention. All quantities given are in parts by weight unless otherwise specified.

EXAMPLES 1-7

Each of the flux compositions for comparative Examples 1 through 7 were prepared by mixing the zinc-ammonium chloride and other ingredients in a dry mixer until a homogeneous dispersion was obtained.

In order to determine the flux life of the above examples, each flux composition was tested on an experimental roll solder bath. In the tests, Example 1 without the alkali metal chloride served as the control. The experimental solder bath employed was of the same design as the commercial solder baths actually used in the can making industry except that the solder roll was of a shorter length. The solder bath comprised a heated iron tank 10 inches long, 6¼ inches wide and 4 inches deep in which a solder roll 4 inches in diameter and 6 inches in length was mounted across the tank at a point equidistant between the ends and 2½ inches from the bottom. The roll had a cylindrical working surface 4½ inches long which terminated in a ⅟₁₆ inch radius at each end. The bath was filled with solder in an amount sufficient to bring the level of the molten liquid to the center line of the roll. The solder employed was a low tin content type containing 2 percent tin and 98 percent lead.

In each test, 300 grams of flux composition were placed on the surface of the solder on the side of the bath where the roll re-entered. The temperature of the solder bath was maintained at about 725° F. for each test, and the roll was rotated at a speed of about 120 r.p.m. The life of the flux was determined by measuring the time until noticeable areas on the roll surface failed to be wetted by the solder. The active flux life for each of the examples as determined by this procedure is set forth in the following table.

TABLE

| Example No. | 1 | 2 | 3 | 4 | 5 | 6 | 7 |
|---|---|---|---|---|---|---|---|
| Sodium chloride, percent by weight of composition | | 1.7 | 4.4 | 8.9 | 17.9 | 22.4 | 26.8 |
| Flux life, 725° F. (minutes) | 330 | 360 | 420 | 437 | 465 | 350 | 275 |

In carrying out the tests on the above formulations, it was noted that Examples 2-6 fused at a temperature of 600° F. or below whereas the fusion temperature for Examples 1 and 7 exceeded 600° F.

From the results obtained it is readily apparent that a substantial increase in flux life was obtained with the formulations representing Examples 2-6 which contained approximately 1.7, 4.4, 8.9, 17.9 and 22.4 weight percent of sodium chloride, respectively. The increase in flux life for these examples ranged between about 6 and 40 percent as compared to the control (Example 1) which did not contain sodium chloride. Example 7 which contained about 27 weight percent of sodium chloride actually exhibited a shorter active life than the control which is presumably due to the large proportion of inert salt compared to active zinc-ammonium chloride salt.

In a further test, the flux life of Examples 1 and 5 were measured at 760° F. according to the procedure described above. At this higher temperature, the flux life of Example 1 was 300 minutes whereas the life of Example 5 was 405 minutes or 35 percent greater than the control. When diatomaceous earth was substituted for the expanded volcanic ash in these formulations, comparable results were obtained.

| Ingredients | Example (parts by weight) | | | | | | |
|---|---|---|---|---|---|---|---|
| | 1 | 2 | 3 | 4 | 5 | 6 | 7 |
| Zinc-ammonium chloride (ZnCl₂·2NH₄Cl) | 1,620 | 1,588 | 1,539 | 1,458 | 1,296 | 1,215 | 1,134 |
| Sodium chloride | | 32 | 81 | 162 | 324 | 405 | 486 |
| Zinc oxide | 130.5 | 130.5 | 130.5 | 130.5 | 130.5 | 130.5 | 130.5 |
| Expanded volcanic ash (expanded perlite) | 57.9 | 57.9 | 57.9 | 57.9 | 57.9 | 57.9 | 57.9 |
| Phenol-formaldehyde resin modified with pentaerythritol ester of rosin ("Pentacite No. 1405") | 2.16 | 2.16 | 2.16 | 2.16 | 2.16 | 2.16 | 2.16 |

EXAMPLE 8

Ingredients: Parts by wt.
Zinc-ammonium chloride (ZnCl₂·2NH₄Cl) _____ 1296
Potassium chloride _____ 324
Zinc oxide _____ 130.5
Expanded volcanic ash (expanded perlite) ___ 57.9
Phenol-formaldehyde resin modified with pentaerythritol ester of rosin-("Pentacite No. 1405") _____ 2.16

This composition was prepared and its flux life determined at 725° F. according to the procedures described for Examples 1-7.

The flux life measured for this formulation was 355 minutes as compared to about 330 minutes for a control without alkali metal chloride which was identical in composition to Example 1 above.

Example 9

| Ingredients: | Parts by wt. |
|---|---|
| Zinc-ammonium chloride ($ZnCl_2 \cdot 2NH_4Cl$) | 1296 |
| Potassium chloride | 162 |
| Sodium chloride | 162 |
| Zinc oxide | 130.5 |
| Expanded volcanic ash (expanded perlite) | 57.9 |
| Phenol-formaldehyde resin modified with pentaerythritol ester of rosin-("Pentacite No. 1405") | 2.16 |

The above flux composition was prepared in the same manner as Examples 1–7.

The flux life of Example 9 was determined at both 725° F. and 760° F. using the procedure described above, and the control used as a basis for comparison was identical in composition to Example 1.

At 725° F. and 760° F., the control gave a flux life of about 330 minutes and 300 minutes, respectively. In comparison, the flux life of Example 9 was 485 minutes at 725° F. and 423 minutes at 760° F. or about a 50% longer life at the lower temperature and about a 40% longer life at the higher temperature as compared to the control.

From the foregoing examples and discussion, it is apparent that the flux compositions of the present invention perform extremely well on soldering baths maintained at both high temperatures and comparatively low temperatures. Under the soldering conditions ordinarily encountered, they exhibit a marked increase in active life and thus, keep the solder roll cleaned and "tinned" over longer times. In addition to increased flux life and the attendant economic advantages, the present compositions do not require stirring or other attention on the bath once soldering temperatures have been reached. Also, the compositions may be rapidly prepared by simple mixing of ingredients, and the composition may be stored without danger of caking.

I claim:

1. A solder flux comprising at least about 60 weight percent of zinc-ammonium chloride, at least about 1.5 weight percent of inert, low density particles capable of absorbing the fusible flux ingredients, and between about 1.5 and 22.5 weight percent of a member selected from the group consisting of an alkali metal chloride and mixtures thereof.

2. A soldier flux according to claim 1 wherein the zinc-ammonium chloride is present in amounts ranging between about 60 and 80 weight percent and contains between about 44 and 54% by weight of ammonium chloride.

3. A solder flux according to claim 1 wherein the alkali metal chloride is sodium chloride.

4. A solder flux according to claim 1 wherein the alkali metal chloride is potassium chloride.

5. A solder flux according to claim 1 wherein the alkali metal chloride mixture is composed of sodium chloride and potassium chloride.

6. A solder flux comprising 71.6 weight percent zinc-ammonium chloride, 7.2 weight percent zinc oxide, 17.9 weight percent sodium chloride, about 0.1 weight percent of a phenol-formaldehyde resin modified with the pentaerythritol ester of rosin, and 3.2 weight percent of inert, low density particles capable of absorbing the fusible flux ingredients.

7. A solder flux according to claim 6 wherein the inert particles are diatomaceous earth.

8. A solder according to claim 6 wherein the inert particles are expanded volcanic ash.

References Cited

UNITED STATES PATENTS 2,662,840   12/1953   Schilling et al. _____ 148—23

DAVID L. RECK, *Primary Examiner.*

HYLAND BIZOT, *Examiner.*

H. F. SAITO, W. W. STALLARD, *Assistant Examiners.*